C. T. Appleton.

Bleaching Apparatus.

No. 311. Reissued May 22, 1855.

UNITED STATES PATENT OFFICE.

CHARLES T. APPLETON, OF ROXBURY, MASSACHUSETTS.

IMPROVEMENT IN BLEACHING APPARATUS.

Specification forming part of Letters Patent No. 12,709, dated April 17, 1855; Reissue No. 311, dated May 22, 1855.

*To all whom it may concern:*

Be it known that I, CHARLES T. APPLETON, of Roxbury, in the county of Norfolk and State of Massachusetts, have invented certain new and useful Improvements in the Art of Bleaching, of which the following is a full, clear, and exact description, reference being had to the annexed drawings, making a part of this specification, in which—

Figure 1:
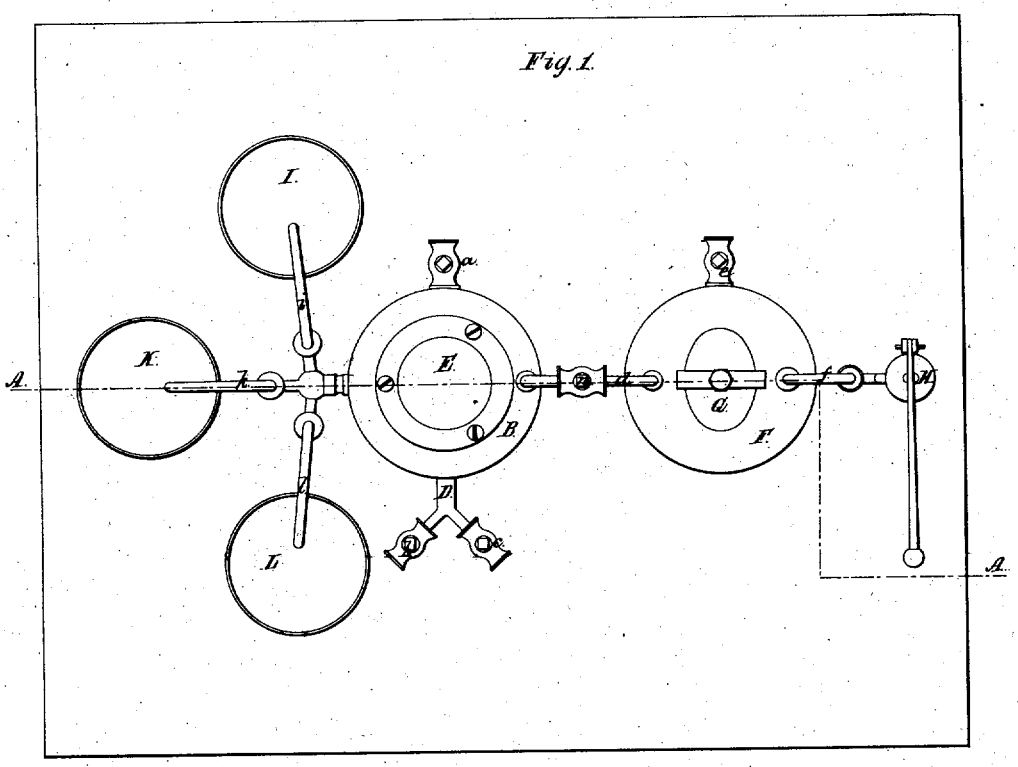
Figure 2:
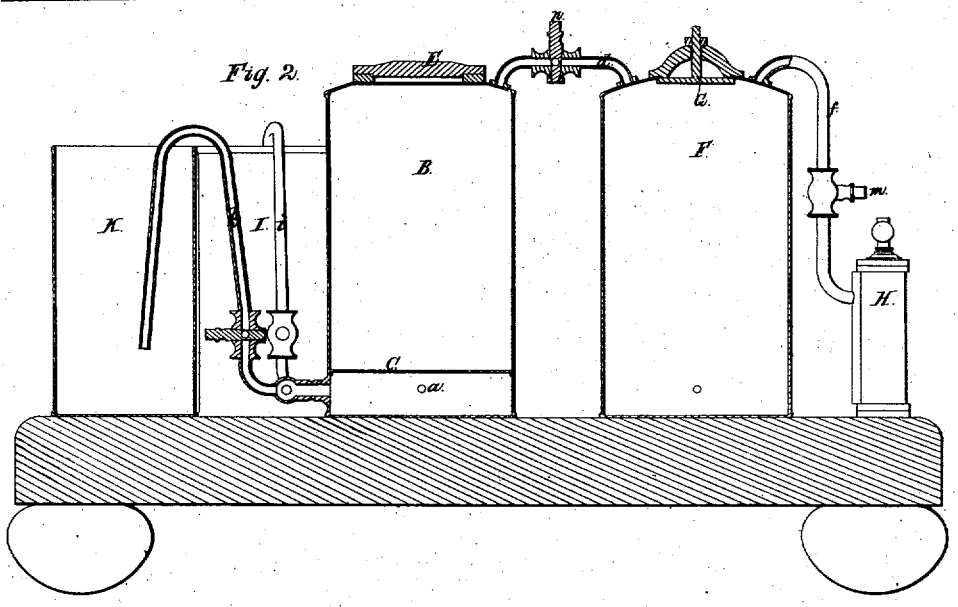

Figure 1 is a plan of the apparatus employed; Fig. 2, a vertical section upon the line A A of Fig. 1.

The nature of my invention consists in exhausting the air from the vat which contains the goods while they are undergoing the various operations in the process of bleaching, by which means I am enabled to perform these operations with great dispatch and with far less labor than has heretofore been required for the purpose.

To enable others skilled in the are to make use of my invention, I will proceed to describe the manner in which I have carried it out.

B is the vat which receives the goods, a perforated strainer or false bottom, C, preventing them from falling to the bottom of the vat. This vat is closed by a tight-fitting cover, E, suitably secured by means of screws or otherwise. *a* is an outlet-pipe and cock from the bottom of this vessel.

D is a branched pipe having two cocks, *b* and *c*, the one being in communication with a head of water, to be used in the various washings which the goods are to receive, and the other bringing steam for heating and boiling purposes.

The vessel B communicates by means of the pipe *d* with another vessel, F, which latter is also furnished with a tight-fitting cover, G.

H is an air-pump for the purpose of exhausting the air from the vessel F, with which it communicates by means of the pipe *f*.

*e* is a cock through which any liquid which passes into or condenses within the vat F may be drawn off.

I K L are vessels for the purpose of containing chlorine, water, and soda, the water being used to temper the strength of the other solutions as may be required. The pipes *i*, *k*, and *l*, also furnished with cocks, as seen in the drawings, establish a communication between these vessels and the vat B.

*m* is a cock in the pipe leading from the air-pump H to the vessel F.

It is evident that the vessels should be made of materials calculated to resist the action of the various agents employed, those from which the atmosphere is to be exhausted being of a suitable strength to sustain the outward pressure of the atmosphere.

Operation: The goods being placed in the vat B, cold water is admitted through the pipe D and cock *c* in sufficient quantity to cover them. The air-pump is then put in operation, and the air is exhausted from the vessel F. The cock *n* is then opened and the air is exhausted from the vessel B, which causes the globules of air within the pores of the goods to expand and escape. The atmosphere is then admitted, and the liquid is forced by the pressure of the atmosphere into the pores of the goods, left vacant by the expansion of the air. The water is then heated and the goods are allowed to steep. The goods are then thoroughly washed in the following manner. The air is exhausted from the vessels F and B, and the cock *m* being closed to prevent the admission of liquid to the air-pump, the cock *c* is opened and water is permitted to flow through the goods into the vessels F and B. The cocks *e* and *a* are then opened, and the water is permitted to flow from the vessels F and B. This operation is repeated until the water runs from the goods perfectly clear. This I have found to be a most rapid, economical, and efficacious method of washing, the exhausting of the atmosphere freeing the fibers and pores of the goods of the globules of air which they contain, and which prevent the ready admission of the water. Alkali is then introduced and the receiver is again exhausted for the purpose, as before, of bringing the liquid into more immediate contact with the fibers of the goods. The goods are then boiled in the alkali by a steam-worm or otherwise, which may be done at a temperature below 212°, if the air be exhausted from the vessel. The alkali being run off and water introduced, the goods are thoroughly washed as before. The chlorine solution is then admitted to the goods, and the air is again exhausted. The sour is then run in, the chlorine being first drawn off. Lastly, the goods are again washed, as before, until the water which comes from them is no longer acid.

The above-described apparatus is particularly applicable to the process of washing, and it may be applied to this purpose alone, the other steps in the bleaching operation being performed in other vessels. Under certain circumstances also, when a large quantity of goods is heated at a time, I propose to employ two exhausting-vats similar to B.

The goods, after being carried through the various washings and other preliminary steps in one of them, are then run into the other, where they are subjected to the chlorine and the sour, and in which they are finally washed. These are, however, but modifications of the process already described, and I do not therefore limit myself to the use of a single exhausting-vat, but intend to make use of one or more, as may be required.

What I claim as my invention, and desire to secure by Letters Patent, is—

The combination of one or more air-tight vats for receiving and containing the goods, an apparatus for exhausting the air therefrom, and the necessary vessels for containing the liquids used in the process of bleaching, whereby the various steps may be performed in a much shorter space of time than has heretofore been required, as set forth.

C. T. APPLETON.

Witnesses:
SAM. COOPER,
JOHN S. CLOW.